(12) United States Patent
Chen et al.

(10) Patent No.: US 10,663,847 B2
(45) Date of Patent: May 26, 2020

(54) WAVELENGTH CONVERSION MODULE, FORMING METHOD OF WAVELENGTH CONVERSION MODULE, AND PROJECTION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW); Jo-Han Hsu, Hsin-Chu (TW); Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/286,613

(22) Filed: Feb. 27, 2019

(65) Prior Publication Data

US 2019/0331989 A1 Oct. 31, 2019

(30) Foreign Application Priority Data

Apr. 28, 2018 (CN) .......................... 2018 1 0400211

(51) Int. Cl.
*G03B 21/20* (2006.01)
*G03B 21/16* (2006.01)

(52) U.S. Cl.
CPC ............ *G03B 21/204* (2013.01); *G03B 21/16* (2013.01); *G03B 21/2066* (2013.01)

(58) Field of Classification Search
CPC .. G03B 21/16; G03B 21/204; G03B 21/2013; G03B 21/2033; G03B 21/2066;

(Continued)

(56) References Cited

U.S. PATENT DOCUMENTS

2012/0032219 A1* 2/2012 Ooyabu ................. B82Y 30/00
257/98
2012/0094083 A1* 4/2012 Nakamura .............. B32B 18/00
428/172

(Continued)

FOREIGN PATENT DOCUMENTS

CN 204593250 8/2015
CN 105278226 1/2016

(Continued)

*Primary Examiner* — Sultan Chowdhury
(74) *Attorney, Agent, or Firm* — JCIPRNET

(57) ABSTRACT

A wavelength conversion module, a forming method of a wavelength conversion module, and a projection device are provided. The wavelength conversion module includes a substrate and a plurality of wavelength conversion units. The wavelength conversion units are located on the substrate, wherein the wavelength conversion units include a first wavelength conversion unit and a second wavelength conversion unit, the first wavelength conversion unit includes a first wavelength conversion material and a first doping material, the second wavelength conversion unit includes a second wavelength conversion material and a second doping material, the first wavelength conversion material and the second wavelength conversion material are different from each other, and the first doping material and the second doping material are different from each other. By the wavelength conversion units comprising different doping materials, low cost, good heat resistance and efficient light emitting are achieved.

21 Claims, 7 Drawing Sheets

(58) Field of Classification Search
CPC .......... G03B 21/2093; C04B 2235/764; C04B 2235/3225; C04B 2235/3229; C04B 2235/3418; C04B 2235/9653; C04B 2235/9661
See application file for complete search history.

(56) References Cited

U.S. PATENT DOCUMENTS

| | | | |
|---|---|---|---|
| 2013/0146918 A1* | 6/2013 | Chen ................. | C09K 11/7774 257/98 |
| 2013/0280520 A1* | 10/2013 | Pan ................... | C09K 11/7792 428/331 |
| 2013/0322056 A1 | 12/2013 | Konuma et al. | |
| 2015/0098070 A1* | 4/2015 | Hsieh ................. | G02F 1/353 355/67 |
| 2016/0173837 A1* | 6/2016 | Miyata ............... | G03B 21/2013 353/31 |
| 2018/0259158 A1* | 9/2018 | Cui .................... | G03B 21/204 |
| 2019/0179220 A1* | 6/2019 | Hu ..................... | G02B 26/008 |

FOREIGN PATENT DOCUMENTS

| CN | 103912848 | 7/2016 |
|---|---|---|
| CN | 205507347 | 8/2016 |
| CN | 206610072 | 11/2017 |

* cited by examiner

WAVELENGTH CONVERSION MODULE, FORMING METHOD OF WAVELENGTH CONVERSION MODULE, AND PROJECTION DEVICE

CROSS-REFERENCE TO RELATED APPLICATION

This application claims the priority benefit of China application serial no. 201810400211.2, filed on Apr. 28, 2018. The entirety of the above-mentioned patent application is hereby incorporated by reference herein and made a part of this specification.

BACKGROUND

Technical Field

The disclosure relates to an optical member, a forming method thereof, and an optical device including the optical member, and more particularly, to a wavelength conversion module, a forming method of a wavelength conversion module, and a projection device.

Related Art

Recently, projection devices mainly using solid-state light sources such as light-emitting diodes (LEDs) and laser diodes are becoming overwhelming in the market. With the light emitting efficiency of laser diodes is generally 20% higher than other light sources, laser light sources are being developed to generate pure light beams required by a projector by ways of exciting phosphor powders, which may be used to break the limitation of LED.

However, currently, as regard to a laser projector, wavelength conversion regions for different wavelengths on a phosphor wheel are generally formed by the same process. For example, in a current process, a phosphor wheel is manufactured by coating a mixture of phosphor powders and silicone on a substrate. However, silicone may not be desirable as for heat resistance, and may be subjected to be degraded under a high temperature. Thus, after a phosphor wheel being excited by a laser beam for a long time, the silicone may be likely to be degraded or be damaged due to a high temperature. As a result, the light emitting efficiency and reliability of such a phosphor wheel may be compromised. Moreover, in another process, a phosphor wheel may be manufactured by ways of sintering a mixture of phosphor powders and glass powders or a mixture of phosphor powders and ceramic powders. However, such a manufacturing process may be less competitiveness due to high costs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a wavelength conversion module, which may be advantageous in manufacturing cost, reliability, and optical quality.

The disclosure provides a forming method of a wavelength conversion module, the forming method is performed at low cost, and the wavelength conversion module formed by ways of the forming method has good reliability and optical quality.

The disclosure provides a projection device, which may be manufactured at low cost and has good reliability.

Other objectives and advantages of the disclosure may be further understood from the technical features disclosed in the disclosure.

To achieve one of, a part of or all of the above objectives or other objectives, an embodiment of the disclosure provides a wavelength conversion module. The wavelength conversion module has a plurality of optical regions, and includes a substrate and a plurality of wavelength conversion units. The wavelength conversion units are located on the substrate and correspondingly disposed on the optical regions respectively. The wavelength conversion units include a first wavelength conversion unit and a second wavelength conversion unit. The first wavelength conversion unit includes a first wavelength conversion material and a first doping material, and the second wavelength conversion unit includes a second wavelength conversion material and a second doping material. The first wavelength conversion material and the second wavelength conversion material are different from each other, and the first doping material and the second doping material are different from each other.

To achieve one of, a part of or all of the above objectives or other objectives, an embodiment of the disclosure provides a forming method of a wavelength conversion module, the forming method including the following steps. A substrate is provided, wherein the substrate has a plurality of regions, and the regions include a first region and a second region. A first wavelength conversion layer is provided and attached to the first region of the substrate, wherein a first wavelength conversion material and a first doping material are located within the first wavelength conversion layer. A second wavelength conversion layer is formed in the second region of the substrate, wherein a second wavelength conversion material and a second doping material are located within the second wavelength conversion layer. Moreover, the first wavelength conversion material and the second wavelength conversion material are different from each other, and the first doping material and the second doping material are different from each other.

To achieve one of, a part of or all of the above objectives or other objectives, an embodiment of the disclosure provides a projection device. The projection device includes a wavelength conversion module, an excitation light source, a light valve and a projection lens. The wavelength conversion module has a plurality of optical regions, and includes a substrate and a plurality of wavelength conversion units. The wavelength conversion units are located on the substrate and correspondingly disposed on the optical regions respectively. The wavelength conversion units include a first wavelength conversion unit and a second wavelength conversion unit. The first wavelength conversion unit includes a first wavelength conversion material and a first doping material, and the second wavelength conversion unit includes a second wavelength conversion material and a second doping material. The first wavelength conversion material and the second wavelength conversion material are different from each other, and the first doping material and the second doping material are different from each other. The excitation light source is configured to emit an excitation beam, wherein the excitation beam is transmitted to the wavelength conversion module and is converted into an illumination beam by the wavelength conversion module. The light valve is located on a transmission path of the illumination beam and is configured to convert the illumination beam into an image beam. The projection lens is located on a transmission path of the image beam and is configured to convert the image beam into a projection beam.

Based on the above, the embodiments of the disclosure at least have one of the following advantages or effects. In the embodiments of the disclosure, by the wavelength conversion units having different doping materials, the wavelength conversion module and the projection device may be advantageous in manufacturing cost, heat resistance and light emitting efficiency. In this way, the wavelength conversion module may be low-cost and have a lower risk of breaking down caused by a high temperature. Thus, both the wavelength conversion module and the projection device may be low-cost and have good optical quality and reliability. In another aspect, in the forming method of a wavelength conversion module according to the embodiments of the disclosure, the wavelength conversion module is partially formed of the wavelength conversion units manufactured by ways of different manufacturing processes. Thus, the cost is reduced while good optical quality and reliability of the wavelength conversion module may be maintained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
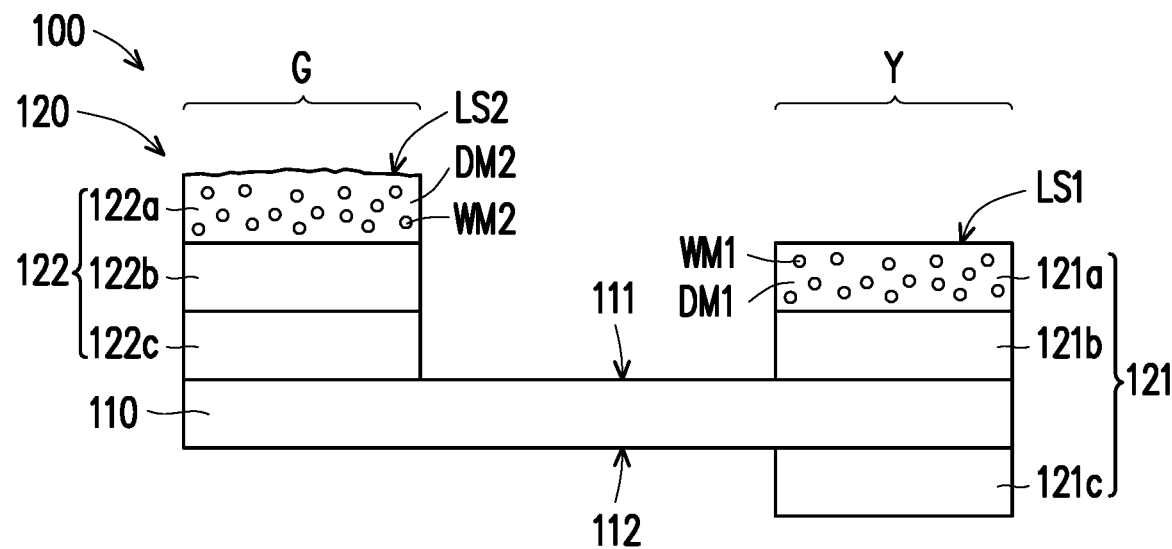
FIG. 1A is a schematic cross-sectional view of a wavelength conversion module according to an embodiment of the disclosure.
Figure 1B:
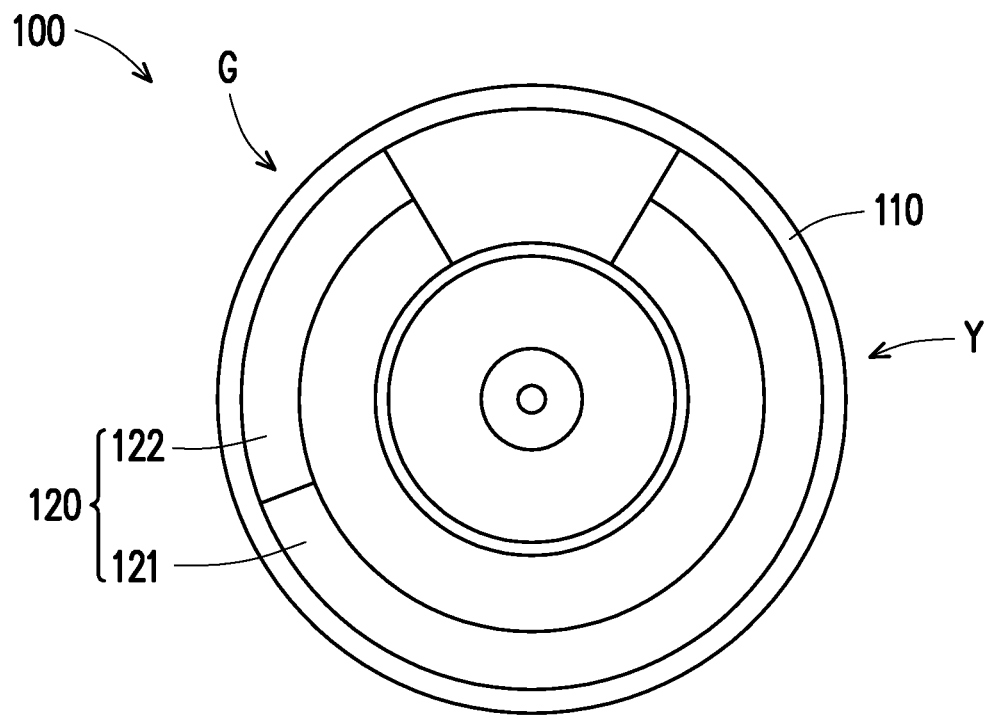
FIG. 1B is a top view of the wavelength conversion module in FIG. 1A.

FIG. 1A is a schematic cross-sectional view of a wavelength conversion module according to an embodiment of the disclosure. FIG. 1B is a top view of the wavelength conversion module in FIG. 1A. Referring to FIG. 1A and FIG. 1B, a wavelength conversion module 100 of the present embodiment has a plurality of optical regions Y and G, and the wavelength conversion module 100 includes a substrate 110 and a plurality of wavelength conversion units 120. Specifically, as shown in FIG. 1A, in the present embodiment, the wavelength conversion units 120 are located on the substrate 110 and are correspondingly disposed on the optical regions Y and G respectively. The wavelength conversion units 120 include a first wavelength conversion unit 121 and a second wavelength conversion unit 122. The first wavelength conversion unit 121 includes a first wavelength conversion material WM1 and a first doping material DM1, and the second wavelength conversion unit 122 includes a second wavelength conversion material WM2 and a second doping material DM2. The first wavelength conversion material WM1 and the second wavelength conversion material WM2 are different from each other, and the first doping material DM1 and the second doping material DM2 are different from each other. The first doping material DM1 and the second doping material DM2 are respectively, for example, binders made from different materials. In this way, during the manufacturing of the wavelength conversion module 100, different doping materials may be selected for wavelength conversion units 120 of different wavelength conversion materials. Thus, the wavelength conversion module 100 can be formed as required by cost and performance.

For example, since silicone is not such desirable as for heat-resistance, and may be subjected to be degraded under a high temperature, compared with a wavelength conversion unit 120 manufactured by using silicon dioxide or ceramic as a doping material, a wavelength conversion unit 120 manufactured by using silicone as a doping material to form a mixture together with the same wavelength conversion material may be less advantageous.

More specifically, as for a wavelength conversion unit 120 which is manufactured by using phosphor powders that produces a yellow beam (i.e., phosphor powders for yellow) as the wavelength conversion material and the silicone as the doping material, capability of such a wavelength conversion unit 120 to endure excitation beam energy may be defined 100%. As such, capability to endure excitation beam energy of a wavelength conversion unit which is manufactured by using silicon dioxide (e.g., glass) instead of silicone as the doping material may be within a range of 150% to 180%, and such capability of a wavelength conversion unit manufactured by using ceramic as a doping material may be within a range of 180% to 250%. It should be noted that the numerical ranges mentioned herein are only for illustrative purposes and are not used to limit the disclosure.

In another aspect, since phosphor powder that produces green beams (phosphor powders for green) may have a better capability to endure excitation beam energy than phosphor powders for yellow, a wavelength conversion unit 120 with phosphor powders for green used as the wavelength conversion material may have a better capability to endure excitation beam energy. For example, Given that the capability to endure excitation beam energy of a wavelength conversion unit 120 which uses phosphor powders for yellow as the wavelength conversion material and uses silicone as the doping material is assumed 100% in value, that capability of a wavelength conversion unit 120 which uses phosphor powders for green as the wavelength conversion material and uses silicone as the doping material may fall in a range of 130% to 150%. In another aspect, with the phosphor powders for green used as the wavelength conversion material, that capability of such a wavelength conversion unit 120 manufactured by using silicon dioxide as a doping material may fall in a range of 180% to 200%, while the capability may fall in a range of 200% to 270% when ceramic is used as a doping material. It should be noted that the numerical ranges mentioned herein are only for illustrative purposes and are not used to limit the disclosure.

However, the wavelength conversion unit 120 manufactured using silicone as the doping material has low manufacturing cost. Therefore, if the requirement for the capability to endure excitation beam energy is not high, using silicone as the doping material to manufacture the wavelength conversion unit 120 may reduce the manufacturing cost and thus facilitate mass production.

Therefore, the wavelength conversion module 100 may be manufactured by selecting different doping materials for wavelength conversion units 120 having different wavelength conversion materials, so as to meet the requirements of both cost and product quality. For example, as shown in FIG. 1A, in the present embodiment, when the first wavelength conversion material WM1 contains phosphor powders for yellow, the first doping material DM1 may be selected to contain ceramic or silicon dioxide, so as to achieve a first wavelength conversion unit 121 with good light emitting efficiency, heat resistance and reliability. When the second wavelength conversion material WM2 contains phosphor powders for green, the second doping material DM2 may be selected to contain silicone, so as to achieve a second wavelength conversion unit 122 with low manufacturing cost while maintaining good light emitting efficiency, heat resistance and reliability. However, in other embodiments, the second doping material DM2 may be selected to contain ceramic or silicon dioxide. If the first wavelength conversion material WM1 and the second wavelength conversion material WM2 are different from each other, the first doping material DM1 and the second doping material DM2 are chose to be different from each other, so as to achieve the various effects described-above.

In this way, in the wavelength conversion module 100, the wavelength conversion units 120 is manufactured by selecting different doping materials according to different wavelength conversion materials, so as to maintain low cost as well as good heat resistance and light emitting efficiency. In this way, while the manufacturing cost is reduced, a risk that the wavelength conversion module 100 may be damaged due to high temperature is avoided. Thus, the wavelength conversion module 100 has low cost as well as good optical quality and reliability.

A manufacturing process of the wavelength conversion module 100 will be described further below with reference to FIG. 2 to FIG. 3C.

Figure 2:
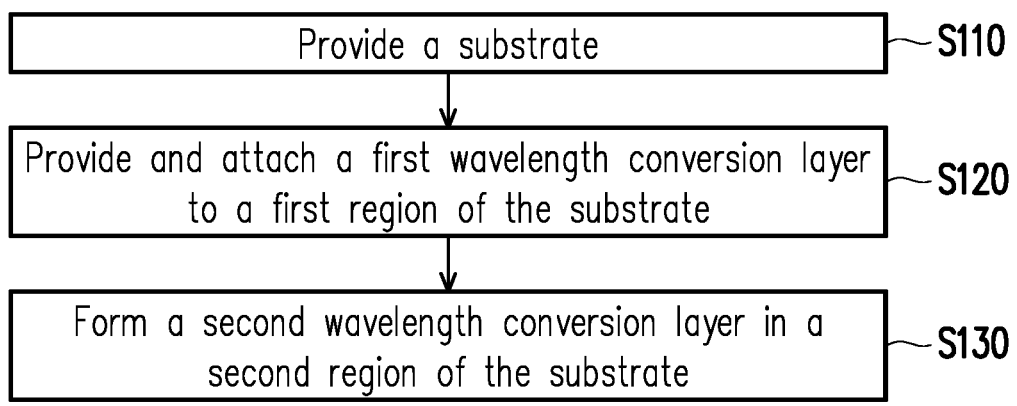
FIG. 2 is a flowchart of a forming method of a wavelength conversion module according to an embodiment of the disclosure.
Figure 3A:
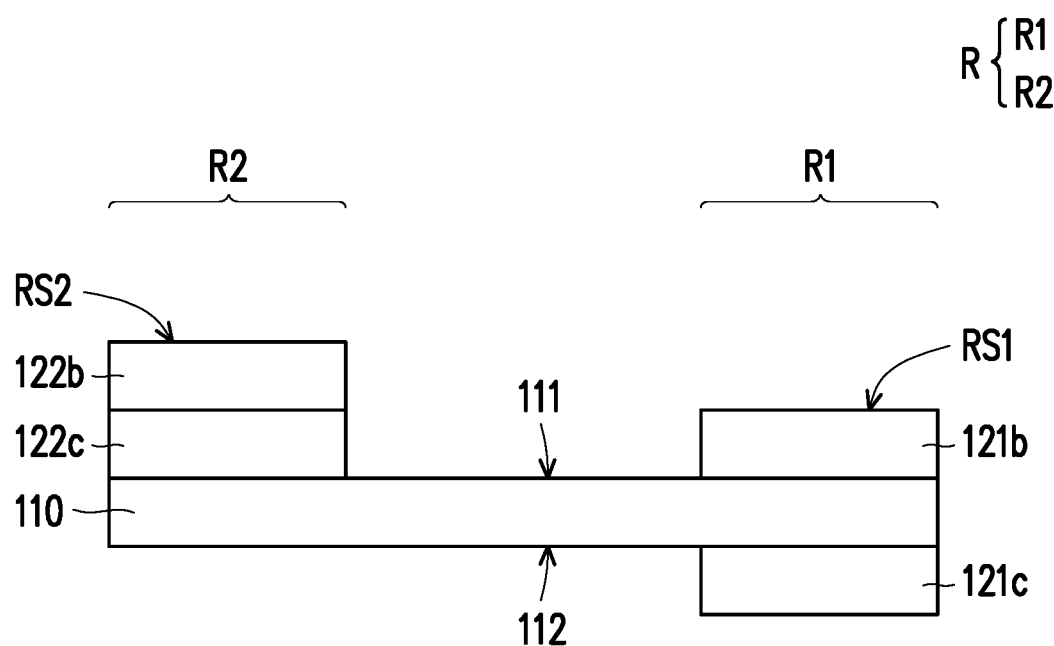
FIG. 3A to FIG. 3C are schematic views of a manufacturing process of a wavelength conversion module according to an embodiment of the disclosure.
Figure 3B:
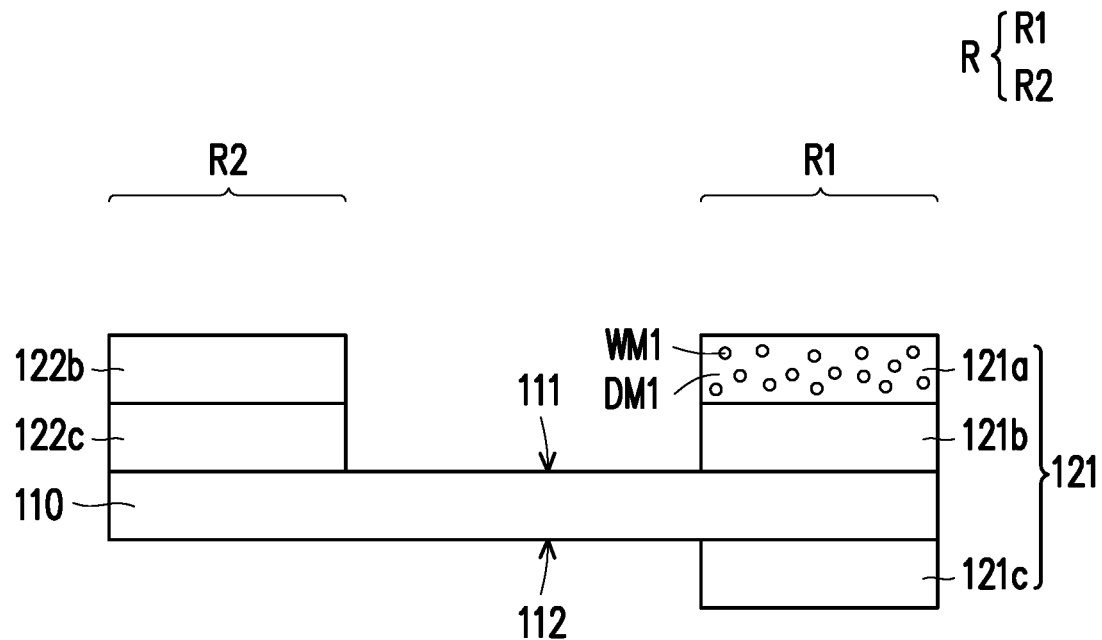

FIG. 2 is a flowchart of a forming method of a wavelength conversion module according to an embodiment of the disclosure. FIG. 3A to FIG. 3C are schematic views of a manufacturing process of a wavelength conversion module according to an embodiment of the disclosure. Referring to FIG. 2 and FIG. 3A, first of all, step S110 is performed in which a substrate 110 is provided. Specifically, as shown in FIG. 3A, in the present embodiment, the substrate 110 has a first surface 111 and a second surface 112 opposite each other, and a plurality of regions R, wherein the regions R include a first region R1 and a second region R2.

More specifically, as shown in FIG. 3A, a first heat dissipating base layer 121c is disposed in the first region R1 of the substrate 110, wherein the first heat dissipating base layer 121c is located on the second surface 112 of the substrate 110. Meanwhile, a second heat dissipating base layer 122c is disposed in the second region R2, wherein the second heat dissipating base layer 122c is located on the first surface 111 of the substrate 110. For example, in the present embodiment, the substrate 110 may be a heat dissipating substrate, and a material thereof may be the same as those of the first heat dissipating base layer 121c and the second heat dissipating base layer 122c. For example, in the present embodiment, the materials of the substrate 110, the first heat dissipating base layer 121c and the second heat dissipating base layer 122c include a metal material such as aluminum which may be preferable to provide good heat dissipation effect. In addition, in the present embodiment, by a manufacturing process such as stamping or molding, the substrate 110, the first heat dissipating base layer 121c and the second heat dissipating base layer 122c can form an integral structure. However, the disclosure is not limited thereto. In another embodiment, the first heat dissipating base layer 121c and the second heat dissipating base layer 122c may be attached to the substrate 110 by using an adhesive by ways of a manufacturing process such as thermoforming, welding or the like.

More specifically, as shown in FIG. 3A, a first reflective layer 121b is also disposed in the first region R1 of the substrate 110, and the first reflective layer 121b is located on the first surface 111 of the substrate 110. That is, the substrate 110 is located between the first heat dissipating base layer 121c and the first reflective layer 121b. Meanwhile, a second reflective layer 122b is also disposed in the second region R2, and the second reflective layer 122b is located on the second heat dissipating base layer 122c. For example, in the present embodiment, the first reflective layer 121b and the second reflective layer 122b may be fabricated as follows. A metal layer having a dielectric layer is plated surfaces of the second heat dissipating base layer 122c and the substrate 110, and a material of the metal layer may be silver or aluminum. Alternatively, a mixture of white scattering particles with silicone or other adhesive (e.g., silicon dioxide) may be formed on surfaces of the second heat dissipating base layer 122c and the substrate 110, and a material of the white scattering particles may be titanium dioxide ($TiO_2$), silicon dioxide ($SiO_2$), aluminum oxide ($Al_2O_3$), boron nitride (BN), and/or zirconium dioxide ($ZrO_2$), so as to form a white diffuse reflection layer.

In this way, in the present embodiment, as shown in FIG. 3A, the first reflective layer 121b on the substrate 110 has a first reflective plane RS1, the second reflective layer 122b has a second reflective plane RS2, and the first reflective plane RS1, the second reflective plane RS2 and the first surface 111 of the substrate 110 are not coplanar with one another, so as to be helpful in the formation of the structure of the following wavelength conversion module 100.

Next, as shown in FIG. 2 and FIG. 3B, step S120 is performed in which a first wavelength conversion layer 121a is provided and attached to the first region R1 of the substrate 110, wherein the first wavelength conversion material WM1 and the first doping material DM1 are located within the first wavelength conversion layer 121a. Generally, since phosphor powders for yellow have relatively weak capability to endure excitation beam energy, it is subjected to suffer fast reduction in conversion efficiency resulted from a thermal effect, and a poor conversion efficiency may be resulted. Therefore, in the present embodiment, when the first wavelength conversion material WM1 contains phosphor powders for yellow, the first doping material DM1 may be selected to contain ceramic or silicon dioxide. More specifically, in the present embodiment, the first wavelength conversion layer 121a is formed by sintering a mixture of the first wavelength conversion material WM1 and the first doping material DM1. In other words, in the present embodiment, the first wavelength conversion layer 121a is formed by, for example, a phosphor-in-glass (PIG) manufacturing process or a phosphor-in-ceramic (PIC) manufacturing process.

In this way, the first wavelength conversion unit 121 can be formed to have good light emitting efficiency, heat resistance and reliability. Specifically, as shown in FIG. 3B, in the present embodiment, the first wavelength conversion unit 121 includes the first wavelength conversion layer 121a, the first reflective layer 121b and the first heat dissipating base layer 121c, and the first reflective layer 121b is located between the first wavelength conversion layer 121a and the first surface 111 of the substrate 110.

Figure 3C:
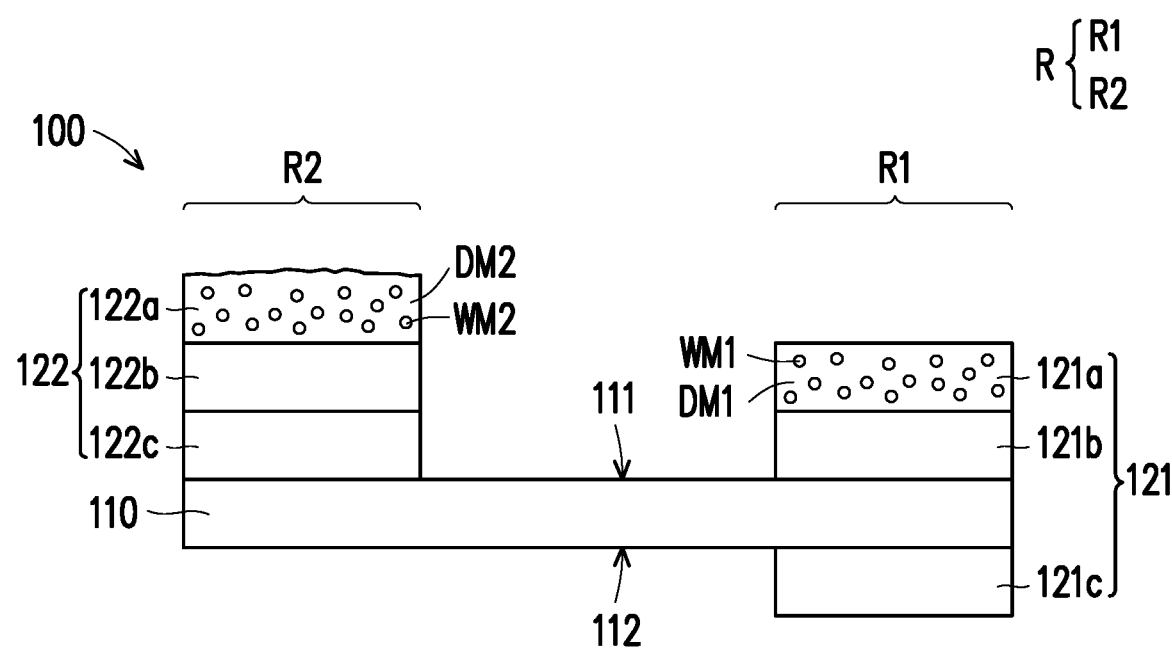

Next, as shown in FIG. 2 and FIG. 3C, step S130 is performed in which a second wavelength conversion layer 122a is formed in the second region R2 of the substrate 110, and the second wavelength conversion material WM2 and the second doping material DM2 are located within the second wavelength conversion layer 122a. For example, since phosphor powders for green have a better capability to endure excitation beam energy than phosphor powders for yellow, when the second wavelength conversion material WM2 contains phosphor powders for green, the second doping material DM2 may be selected to contain silicone. More specifically, in the present embodiment, the step of forming the second wavelength conversion layer 122a is performed, for example, as follows. A solution obtained by mixing the second wavelength conversion material WM2 in the second doping material DM2 is coated across the second region R2 of the substrate 110. Next, the second wavelength conversion layer 122a is cured. In other words, in the present embodiment, the second wavelength conversion layer 122a is formed by a phosphor-in-silicone (PIS) manufacturing process.

In this way, the second wavelength conversion unit 122 with low manufacturing cost can be formed, and the second wavelength conversion unit 122 still maintains good light emitting efficiency, heat resistance and reliability. Specifically, as shown in FIG. 3C, in the present embodiment, the second wavelength conversion unit 122 includes the second wavelength conversion layer 122a, the second reflective layer 122b and the second heat dissipating base layer 122c, wherein the second reflective layer 122b is located between the second wavelength conversion layer 122a and the second heat dissipating base layer 122c.

In this way, the wavelength conversion module 100 as shown in FIG. 1A can be formed. Accordingly, the wavelength conversion module 100 can be formed of wavelength conversion units 120 manufactured by different manufacturing processes, such that the manufacturing cost of the wavelength conversion module 100 can be reduced while good optical quality and reliability can be maintained.

Although in the present embodiment, an example is given in which step S120 in FIG. 2 is first performed and step S130 is then performed, i.e., the step of providing and attaching the first wavelength conversion layer 121a is performed before the forming of the second wavelength conversion layer 122a, the disclosure is not limited thereto. In another embodiment, step S130 in FIG. 2 may be first performed and step S120 is then performed. That is, after the step of forming the second wavelength conversion layer 122a, the first wavelength conversion layer 121a is provided and attached. Persons skilled in the art may adjust the order of steps in the manufacturing process of the wavelength conversion module 100 according to actual needs, and a similar wavelength conversion module 100 can still be formed. The details thereof are omitted herein.

Figure 4:
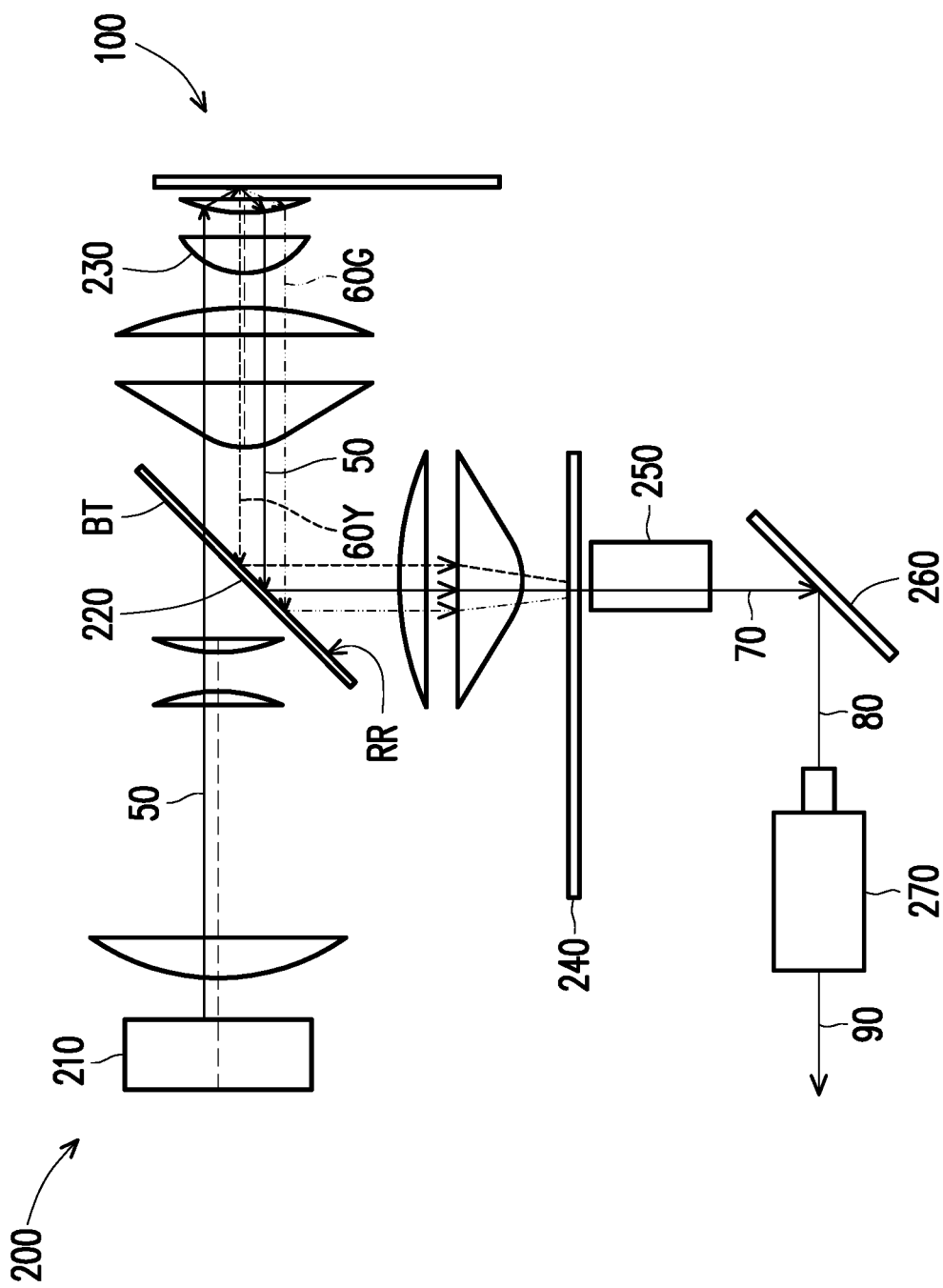
FIG. 4 is a schematic view of the structure of a projection device according to an embodiment of the disclosure.

FIG. 4 is a schematic view of a structure of a projection device according to an embodiment of the disclosure. Referring to FIG. 4, a projection device 200 includes an excitation light source 210, a beam splitting unit 220, a wavelength conversion module 100, a light valve 260 and a projection lens 270. In the present embodiment, the structure and forming method of the wavelength conversion module 100 have been described in detail in the preceding text and will not be repeated. In the present embodiment, the light valve 260 is, for example, a digital micro-mirror device (DMD) or a liquid-crystal-on-silicon panel (LCOS panel). However, in other embodiments, the light valve 260 may be a transmissive liquid crystal panel or other light beam modulator.

As shown in FIG. 4, in the present embodiment, the excitation light source 210 is configured to emit an excitation beam 50. In the present embodiment, the excitation light source 210 is a laser light source, and the excitation beam 50 is a blue laser beam. For example, the excitation light source 210 may include a plurality of blue laser diodes (not illustrated) arranged in array. However, the disclosure is not limited thereto.

Specifically, as shown in FIG. 4, in the present embodiment, the beam splitting unit 220 is disposed on a transmission path of the excitation beam 50 and is located between the excitation light source 210 and the wavelength conversion module 100. Specifically, the beam splitting unit 220 may be a partially transmissive, partially reflective element, a dichroic element, a polarization beam splitter element or any other element capable of splitting a light beam. For example, in the present embodiment, a laser transmission area BT of the beam splitting unit 220, for example, allows a blue beam to pass therethrough and reflects beams of other colors (e.g., red, green, yellow and so on). That is, the laser transmission area BT of the beam splitting unit 220 allows the excitation beam 50 in blue color to pass therethrough. In this way, the excitation beam 50 may pass through the beam splitting unit 220 and is incident to the wavelength conversion module 100. In addition, as shown in FIG. 4, in the present embodiment, the projection device 200 further includes a condenser lens 230. The condenser lens 230 is located between the excitation light source 210 and the wavelength conversion module 100, and may be used to converge the excitation beam 50 toward the wavelength conversion unit 120 of the wavelength conversion module 100.

A process during which the wavelength conversion module 100 converts the excitation beam 50 will be described further below with reference to FIG. 5A and FIG. 5B.

Figure 5B:
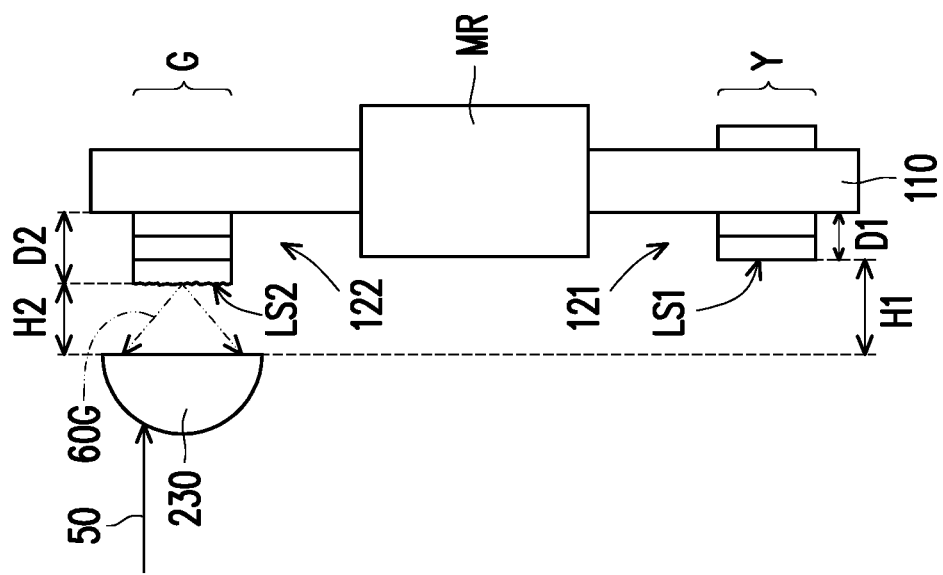
FIG. 5B is a schematic view of relative positions of the condenser lens and the wavelength conversion module in FIG. 4 at another moment.
Figure 5A:
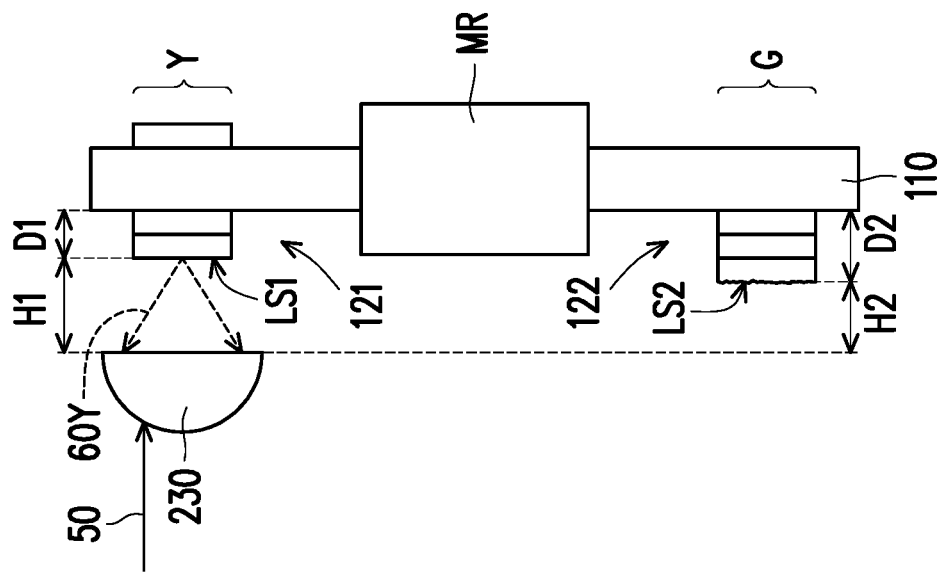
FIG. 5A is a schematic view of relative positions of a condenser lens and a wavelength conversion module in FIG. 4 at a certain moment.

FIG. 5A is a schematic view of relative positions of a condenser lens and a wavelength conversion module in FIG. 4 at a certain moment. FIG. 5B is a schematic view of relative positions of the condenser lens and the wavelength conversion module in FIG. 4 at another moment. Specifically, as shown in FIG. 4, FIG. 5A and FIG. 5B, in the present embodiment, the wavelength conversion module 100 is located on the transmission path of the excitation beam 50. The wavelength conversion module 100 includes a first actuator (motor) MR configured to cause the optical regions Y and G to enter an irradiation range of the excitation beam 50 during different periods. Moreover, the excitation beam 50 is converted into different converted beams 60Y and 60G by the wavelength conversion unit 120 of the wavelength conversion module 100. For example, as shown in FIG. 4 and FIG. 5A, when the optical region Y enters the irradiation range of the excitation beam 50, the excitation beam 50 is converted into the converted beam 60Y by the first wavelength conversion unit 121 in the optical region Y. As shown in FIG. 4 and FIG. 5B, when the optical region G enters the irradiation range of the excitation beam 50, the excitation beam 50 is converted into the converted beam 60G by the second wavelength conversion unit 122 in the optical region G.

Specifically, as shown in FIG. 5A and FIG. 5B, in the present embodiment, the first wavelength conversion unit 121 has a first illuminating surface LS1, and the second wavelength conversion unit 122 has a second illuminating surface LS2. Since the first wavelength conversion unit 121 and the second wavelength conversion unit 122 are manufactured by different manufacturing processes, the first illuminating surface LS1 of the first wavelength conversion unit 121 and the second illuminating surface LS2 of the second wavelength conversion unit 122 have different roughnesses. In this way, when the optical regions Y and G enter the irradiation range of the excitation beam 50, the first illuminating surface LS1 and the second illuminating surface LS2 are required to be maintained at different perpendicular distances from the condenser lens 230, so as to achieve a wavelength conversion module 100 with better light conversion efficiency, such that the brightness is increased.

For example, as shown in FIG. 5A, when the first wavelength conversion unit 121 enters the irradiation range of the excitation beam 50, a first perpendicular distance H1 exists between the first illuminating surface LS1 and the condenser lens 230. As shown in FIG. 5B, when the second wavelength conversion unit 122 enters the irradiation range of the excitation beam 50, a second perpendicular distance H2 exists between the second illuminating surface LS2 and the condenser lens 230. Moreover, as shown in FIG. 5A and FIG. 5B, a value of the first perpendicular distance H1 is different from a value of the second perpendicular distance H2. In the present embodiment, a difference between the value of the first perpendicular distance H1 and the value of the second perpendicular distance H2 generally does not exceed 2 mm. It should be noted that the numerical ranges mentioned herein are only for illustrative purposes and are not used to limit the disclosure.

More in detail, in the present embodiment, since the first wavelength conversion material WM1 may contain phosphor powders for yellow, the first wavelength conversion unit 121 may be formed of the first doping material DM1 that contains ceramic or silicon dioxide. In this case, compared with the second illuminating surface LS2, the first illuminating surface LS1 is smoother and emits light having a smaller divergence angle. Therefore, in the present embodiment, the first perpendicular distance H1 is greater than the second perpendicular distance H2, so as to achieve a better light collection effect and achieve better brightness.

Figure 6:
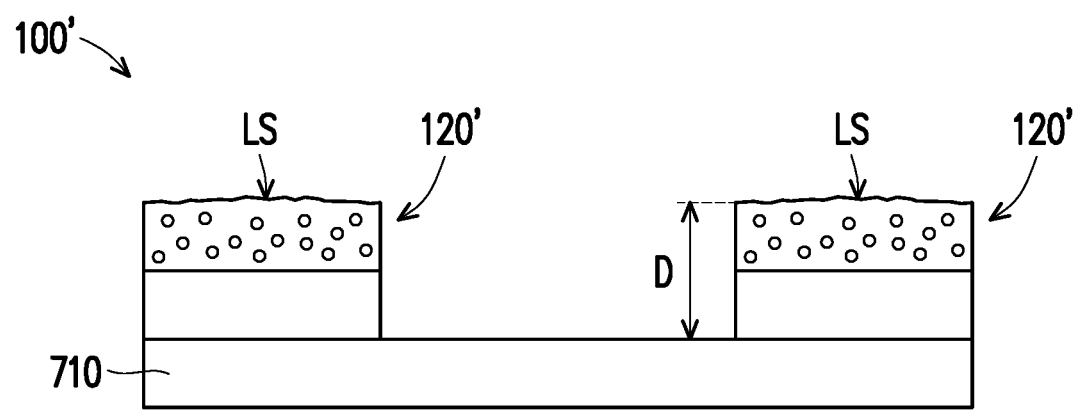
FIG. 6 is a schematic cross-sectional view of a wavelength conversion module according to a comparative example of the disclosure.

FIG. 6 is a schematic cross-sectional view of a wavelength conversion module according to a comparative example of the disclosure. Referring to FIG. 6, a wavelength conversion module 100' in FIG. 6 is similar to the wavelength conversion module 100 in FIG. 1A, and differences therebetween are described as follows. All wavelength conversion units 120' of the wavelength conversion module 100' use silicone as the doping material, and minimum distances D from an illuminating surface LS of each of the wavelength conversion units 120' to the substrate 710 are equal. In this way, when the wavelength conversion module 100' in FIG. 6 is applied to the projection device 200 in FIG. 4, the same perpendicular distance is maintained between the illuminating surface LS of the wavelength conversion units 120' and the condenser lens 230. If illumination brightness at this moment is taken as a reference, when the wavelength conversion module 100 in FIG. 1A in the present embodiment is applied to the projection device 200, the illumination brightness of the projection device 200 is improved by 5% to 10%. It should be noted that the numerical ranges mentioned herein are only for illustrative purposes and are not used to limit the disclosure.

In another aspect, for example, as shown in FIG. 1A, FIG. 5A and FIG. 5B, in the present embodiment, by disposing the second heat dissipating base layer 122c on the first surface 111 of the substrate 110 of the wavelength conversion module 100, the first perpendicular distance H1 is greater than the second perpendicular distance H2. Specifically, as shown in FIG. 1A, FIG. 5A and FIG. 5B, by disposing the second heat dissipating base layer 122c, a minimum distance D1 from the first illuminating surface LS1 of the first wavelength conversion unit 121 to the substrate 110 and a minimum distance D2 from the second illuminating surface LS2 of the second wavelength conversion unit 122 to the substrate 110 are different from each other. For example, in the present embodiment, a thickness difference between the first wavelength conversion unit 121 and the second wavelength conversion unit 122 is between 0 mm and 0.2 mm, a thickness difference between the first reflective layer 121b and the second reflective layer 122b is between 0 mm and 0.2 mm, and thicknesses of the substrate 110 and the second heat dissipating base layer 122c are respectively between about 0.5 mm and 1.0 mm. In this way, a difference is formed between the minimum distance D1 from the first illuminating surface LS1 of the first wavelength conversion unit 121 to the substrate 110 and the minimum distance D2 from the second illuminating surface LS2 of the second wavelength conversion unit 122 to the substrate 110, and the difference generally does not exceed 2 mm, such that the first perpendicular distance H1 is greater than the second perpendicular distance H2. It should be noted that the numerical ranges mentioned herein are only for illustrative purposes and are not used to limit the disclosure.

In another aspect, since the wavelength conversion module 100 is adapted to rotate during a process, as shown in FIG. 1A, FIG. 5A and FIG. 5B, by disposing the first heat dissipating base layer 121c on the second surface 112 of the substrate 110 of the wavelength conversion module 100, mass balance of the wavelength conversion module 100 is maintained and the wavelength conversion module 100 can rotate stably. In the present embodiment, a thickness of the first heat dissipating base layer 121c is, for example, about 0.5 mm to 1.0 mm. It should be noted that the numerical ranges mentioned herein are only for illustrative purposes and are not used to limit the disclosure.

Next, referring again to FIG. 4, after the converted beams 60Y and 60G are formed in sequence, the converted beams 60Y and 60G from the wavelength conversion module 100 as well as the excitation beam 50 are collected by the condenser lens 230 and then guided to a light reflective region RR of the beam splitting unit 220, and are thus guided to a subsequent optical element.

For example, as shown in FIG. 4, the projection device 200 further includes a filter module 240. The filter module 240 is located on a transmission path of the excitation beam 50 and the converted beams 60Y and 60G, and has a filtering area and a light transmissive area (both not illustrated). The filter module 240 further includes a second actuator (not illustrated) configured to cause the filtering area to enter irradiation ranges of the converted beams 60Y and 60G during different periods, so as to form red light and green light respectively. In another aspect, the light transmissive area also correspondingly enters the irradiation range of the excitation beam 50 during different periods to form blue light. In this way, the excitation beam 50 can be converted into an illumination beam 70 of various different colors in a time sequence.

In another aspect, as shown in FIG. 4, in the present embodiment, the projection device 200 further includes a light homogenizing element 250 located on a transmission path of the illumination beam 70. In the present embodiment, the light homogenizing element 250 includes an integration rod. However, the disclosure is not limited thereto. More in detail, as shown in FIG. 4, when the illumination beam 70 is transmitted to the light homogenizing element 250 via an illumination system, the light homogenizing element 250 homogenizes the illumination beam 70 and transmits the same to the light valve 260. The light valve 260 is located on the transmission path of the illumination beam 70 and is configured to convert the illumination beam 70 into an image beam 80. The projection lens 270 is located on a transmission path of the image beam 80 and is configured to convert the image beam 80 into a projection beam 90, so as to project the image beam 80 onto a screen (not illustrated) to form an image. The illumination beam 70 converges at the light valve 260, and the light valve 260 then converts the illumination beam 70 into the image beam 80 in different colors in sequence and transmits the same to the projection lens 270. Thus, the image obtained by projecting the image beam 80 converted by the light valve 260 becomes a colorful image.

Figure 7:
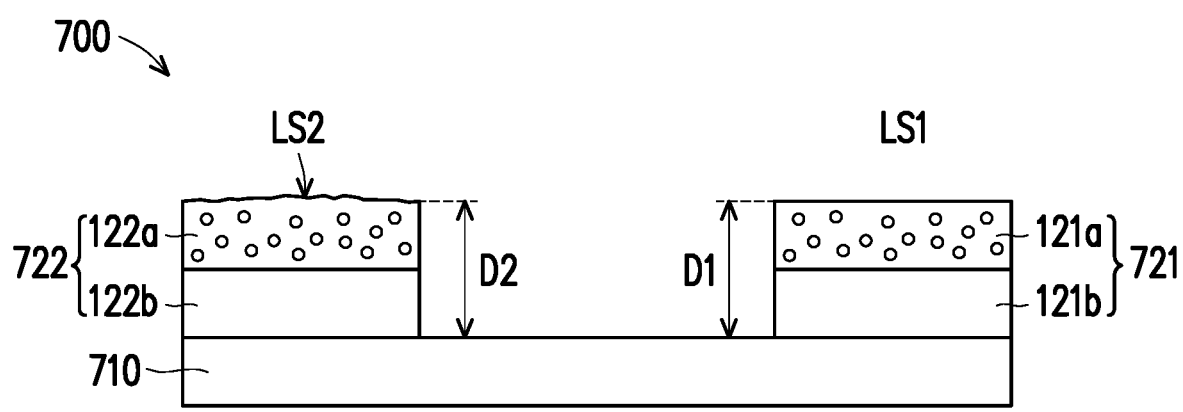
FIG. 7 is a schematic cross-sectional view of another wavelength conversion module according to an embodiment of the disclosure.

FIG. 7 is a schematic cross-sectional view of another wavelength conversion module according to an embodiment of the disclosure. Referring to FIG. 7, a wavelength conversion module 700 in FIG. 7 is similar to the wavelength conversion module 100 in FIG. 1A, and differences therebetween are described as follows. In the present embodiment, the substrate 710 of the wavelength conversion module 700 does not have a first heat dissipating base layer 121c or a second heat dissipating base layer 122c disposed thereon. In other words, the minimum distance D1 from the first illuminating surface LS1 of a first wavelength conversion unit 721 to the substrate 710 and the minimum distance D2 from the second illuminating surface LS2 of a second wavelength conversion unit 722 to the substrate 710 are equal. In this way, when the wavelength conversion module 700 in FIG. 7 is applied to the projection device 200 in FIG. 4, the first perpendicular distance H1 between the first illuminating surface LS1 of the first wavelength conversion unit 721 and the condenser lens 230 is the same as the second perpendicular distance H2 between the second illuminating surface LS2 of the second wavelength conversion unit 722 and the condenser lens 230.

Specifically, in the present embodiment, in the wavelength conversion module 700, the first wavelength conversion unit 721 and the second wavelength conversion unit 722 are respectively formed by different manufacturing processes. Thus, compared with the wavelength conversion module 100' in FIG. 6, when the wavelength conversion module 700 is applied to the projection device 200 in FIG. 4, the illumination brightness of the projection device 200 can also be improved by 2% to 5%, and the similar effects to those of the wavelength conversion module 100 can be achieved. The details thereof are omitted herein. It should be noted that the numerical ranges mentioned herein are only for illustrative purposes and are not used to limit the disclosure.

In summary, the embodiments of the disclosure at least have one of the following advantages or effects. In the embodiments of the disclosure, by using different doping materials for a wavelength conversion unit, the wavelength conversion module and the projection device may be achieved to have low cost as well as good heat resistance and light emitting efficiency. In this way, while the manufacturing cost is reduced, the risk that the wavelength conversion module may be damaged due to high temperature is avoided. Thus, both the wavelength conversion module and the projection device have low cost as well as good optical quality and reliability. In another aspect, in the forming method of a wavelength conversion module according to the embodiments of the disclosure, the wavelength conversion module is formed of the wavelength conversion units manufactured by different manufacturing processes. Thus, the cost is reduced, and good optical quality and reliability of the wavelength conversion module are maintained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, having a plurality of optical regions, and comprising:
   a substrate; and
   a plurality of wavelength conversion units located on the substrate, wherein the plurality of wavelength conversion units are correspondingly disposed on the plurality of optical regions respectively, wherein the plurality of wavelength conversion units comprise a first wavelength conversion unit and a second wavelength conversion unit, the first wavelength conversion unit comprises a first wavelength conversion material and a first doping material, and the second wavelength conversion unit comprises a second wavelength conversion material and a second doping material, and wherein the first wavelength conversion material and the second wavelength conversion material are different from each other, and the first doping material and the second doping material are different from each other, wherein the first wavelength conversion unit has a first illuminating surface, the second wavelength conversion unit has a second illuminating surface, and a minimum distance from the first illuminating surface to the substrate and a minimum distance from the second illuminating surface to the substrate are different from each other.

2. The wavelength conversion module according to claim 1, wherein when the first wavelength conversion material contains phosphor powders for yellow, the first doping material contains ceramic or silicon dioxide.

3. The wavelength conversion module according to claim 1, wherein when the second wavelength conversion material contains phosphor powders for green, the second doping material contains one of silicone, ceramic and silicon dioxide.

4. The wavelength conversion module according to claim 1, wherein the minimum distance from the first illuminating surface to the substrate and the minimum distance from the second illuminating surface to the substrate have therebetween a difference not exceeding 2 mm.

5. A wavelength conversion module, having a plurality of optical regions, and comprising:
   a substrate, wherein the substrate has a first surface and a second surface opposite each other; and
   a plurality of wavelength conversion units located on the substrate, wherein the plurality of wavelength conversion units are correspondingly disposed on the plurality of optical regions respectively, wherein the plurality of wavelength conversion units comprise a first wavelength conversion unit and a second wavelength conversion unit, the first wavelength conversion unit comprises a first wavelength conversion material and a first doping material, and the second wavelength conversion unit comprises a second wavelength conversion material and a second doping material, and wherein the first wavelength conversion material and the second wavelength conversion material are different from each other, the first doping material and the second doping material are different from each other, wherein
   the first wavelength conversion unit further comprises:
   a first wavelength conversion layer, wherein the first wavelength conversion material and the first doping material are located within the first wavelength conversion layer;
   a first reflective layer located between the first wavelength conversion layer and the first surface of the substrate; and
   a first heat dissipating base layer, wherein the substrate is located between the first heat dissipating base layer and the first reflective layer;
   and wherein the second wavelength conversion unit further comprises:
   a second wavelength conversion layer, wherein the second wavelength conversion material and the second doping material are located within the second wavelength conversion layer;
   a second reflective layer located between the second wavelength conversion layer and the first surface of the substrate; and
   a second heat dissipating base layer located between the second reflective layer and the first surface of the substrate.

6. The wavelength conversion module according to claim 5, wherein the first heat dissipating base layer is located on the second surface, and the second heat dissipating base layer is located on the first surface.

7. The wavelength conversion module according to claim 5, wherein the first reflective layer has a first reflective plane, the second reflective layer has a second reflective plane, and wherein the first reflective plane, the second reflective plane and the first surface of the substrate are not coplanar with one another.

8. A forming method of a wavelength conversion module, comprising:

providing a substrate, wherein the substrate has a plurality of regions, and the plurality of regions comprise a first region and a second region;
forming a mixture by mixing a first wavelength conversion material in a first doping material and sintering the mixture to provide a first wavelength conversion layer to the first region of the substrate, wherein the first wavelength conversion material and the first doping material are located within the first wavelength conversion layer;
attaching the first wavelength conversion layer to the first region of the substrate; and
forming a second wavelength conversion layer in the second region of the substrate, wherein a second wavelength conversion material and a second doping material are located within the second wavelength conversion layer, the first wavelength conversion material and the second wavelength conversion material are different from each other, and the first doping material and the second doping material are different from each other.

9. The forming method of a wavelength conversion module according to claim 8, wherein the second wavelength conversion layer is formed after the step of attaching the first wavelength conversion layer.

10. The forming method of a wavelength conversion module according to claim 8, wherein the first wavelength conversion layer is provided and attached after the step of forming the second wavelength conversion layer.

11. The forming method of a wavelength conversion module according to claim 8, wherein the step of forming the second wavelength conversion layer comprises:
coating a solution obtained by mixing the second wavelength conversion material in the second doping material on the second region of the substrate; and
curing the second wavelength conversion layer.

12. A projection device, comprising:
a wavelength conversion module having a plurality of optical regions, and comprising:
a substrate; and
a plurality of wavelength conversion units located on the substrate and correspondingly disposed on the plurality of optical regions respectively, wherein the plurality of wavelength conversion units comprise a first wavelength conversion unit and a second wavelength conversion unit, the first wavelength conversion unit comprises a first wavelength conversion material and a first doping material, the second wavelength conversion unit comprises a second wavelength conversion material and a second doping material, the first wavelength conversion material and the second wavelength conversion material are different from each other, and the first doping material and the second doping material are different from each other, wherein the first wavelength conversion unit has a first illuminating surface, the second wavelength conversion unit has a second illuminating surface, and a minimum distance from the first illuminating surface to the substrate and a minimum distance from the second illuminating surface to the substrate are different from each other;
an excitation light source configured to emit an excitation beam, wherein the excitation beam is transmitted to the wavelength conversion module and is converted into an illumination beam by the wavelength conversion module;
a light valve located on a transmission path of the illumination beam and configured to convert the illumination beam into an image beam; and
a projection lens located on a transmission path of the image beam and configured to convert the image beam into a projection beam.

13. The projection device according to claim 12, further comprising:
a condenser lens located between the excitation light source and the wavelength conversion module.

14. The projection device according to claim 13, wherein when the first wavelength conversion unit enters an irradiation range of the excitation beam, a first perpendicular distance exists between the first illuminating surface and the condenser lens, and when the second wavelength conversion unit enters the irradiation range of the excitation beam, a second perpendicular distance exists between the second illuminating surface and the condenser lens, and wherein a value of the first perpendicular distance is different from a value of the second perpendicular distance.

15. The projection device according to claim 14, wherein a difference between the value of the first perpendicular distance and the value of the second perpendicular distance does not exceed 2 mm.

16. The projection device according to claim 14, wherein when the first wavelength conversion material contains phosphor powders for yellow, the first doping material contains ceramic or silicon dioxide.

17. The projection device according to claim 16, wherein when the first wavelength conversion material contains the phosphor powders for yellow, the first perpendicular distance is greater than the second perpendicular distance.

18. The projection device according to claim 14, wherein when the second wavelength conversion material contains phosphor powders for green, the second doping material contains one of silicone, ceramic and silicon dioxide.

19. The projection device according to claim 12, wherein the substrate has a first surface and a second surface opposite each other, and wherein
the first wavelength conversion unit further comprises:
a first wavelength conversion layer, wherein the first wavelength conversion material and the first doping material are located within the first wavelength conversion layer;
a first reflective layer located between the first wavelength conversion layer and the first surface of the substrate; and
a first heat dissipating base layer, wherein the substrate is located between the first heat dissipating base layer and the first reflective layer;
and the second wavelength conversion unit further comprises:
a second wavelength conversion layer, wherein the second wavelength conversion material and the second doping material are located within the second wavelength conversion layer;
a second reflective layer located between the second wavelength conversion layer and the first surface of the substrate; and
a second heat dissipating base layer located between the second reflective layer and the first surface of the substrate.

20. The projection device according to claim 19, wherein the first heat dissipating base layer is located on the second surface, and the second heat dissipating base layer is located on the first surface.

21. The projection device according to claim 19, wherein the first reflective layer has a first reflective plane, the second reflective layer has a second reflective plane, and wherein the first reflective plane, the second reflective plane and the first surface of the substrate are not coplanar with one another.

* * * * *